(12) United States Patent
Huang et al.

(10) Patent No.: US 8,340,516 B2
(45) Date of Patent: Dec. 25, 2012

(54) GROOMING METHOD AND APPARATUS FOR OPTICAL COMMUNICATION NETWORK

(75) Inventors: Zhiyong Huang, Shenzhen (CN); Buyun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 528 days.

(21) Appl. No.: 12/560,576

(22) Filed: Sep. 16, 2009

(65) Prior Publication Data

US 2010/0021168 A1    Jan. 28, 2010

Related U.S. Application Data

(63) Continuation of application No. PCT/CN2008/070023, filed on Jan. 4, 2008.

(30) Foreign Application Priority Data

Mar. 16, 2007  (CN) .......................... 2007 1 0087515

(51) Int. Cl.
*H04J 14/00* (2006.01)
*H04J 14/04* (2006.01)
(52) U.S. Cl. .................. 398/45; 398/48; 398/52; 398/55
(58) Field of Classification Search ............... 398/45–57
See application file for complete search history.

(56) References Cited

U.S. PATENT DOCUMENTS

| | | | | |
|---|---|---|---|---|
| 2004/0208552 A1* | 10/2004 | Harney et al. | .................... | 398/51 |
| 2007/0009262 A1* | 1/2007 | Perkins et al. | ................... | 398/58 |
| 2010/0027996 A1* | 2/2010 | Chung et al. | .................... | 398/49 |

FOREIGN PATENT DOCUMENTS

| | | |
|---|---|---|
| CN | 1171683 | 1/1998 |
| CN | 1567803 | 1/2005 |
| CN | 1691552 | 11/2005 |
| CN | 101022319 | 8/2007 |
| JP | 2005269246 A | 9/2005 |

OTHER PUBLICATIONS

Singhal N K et al: "Architectures and algorithm for multicasting in WDM optical mesh networks using opaque and transparent optical ,cross-connects"; XP010545759; dated Mar. 17, 2001; total 4 pages.
Shun Yao et al: "Design of hybrid optical networks with waveband and electrical TDM switching"; XP010677622; dated Dec. 1, 2003. total 6 pages.

(Continued)

*Primary Examiner* — Kenneth N Vanderpuye
*Assistant Examiner* — Daniel Dobson
(74) *Attorney, Agent, or Firm* — Conley Rose, P.C.; Grant Rodolph; Rayhao Chung

(57) ABSTRACT

A grooming apparatus for an optical communication network is disclosed. The apparatus mainly includes a first photoelectric integration unit and an electrical-layer grooming unit. The first photoelectric integration unit includes a wavelength division multiplexing/demultiplexing unit and a photo-electric/electric-photo conversion unit. The wavelength division demultiplexing unit is configured to demultiplex a multi-wavelength optical signal into single-wavelength optical signals. The photo-electric conversion unit is configured to convert the single-wavelength optical signals to single-wavelength electrical signals. The electrical-layer grooming unit is configured to groom the single-wavelength electrical signals. The present invention overcomes the fatal defect of light dispersion, light power estimation, light power adjustment, OSNR limitation for a conventional OADM/ROADM system. Also, the flexibility of the electrical-layer grooming eliminates the wavelength broadcast and multicast issue. The processing of the electrical layer also addresses the wavelength monitoring issue and the wavelength conflict issue.

10 Claims, 9 Drawing Sheets

OTHER PUBLICATIONS

Keyao Zhu et al: "A Review of Traffic Grooming in WDM Optical Networks: Architectures and Challenges", XP001162697, dated Mar. 1, 2003, total 10 pages.

Mukherjee B et al: "Traffic grooming in mesh optical networks", XP010745839, dated Feb. 26, 2004, total 4 pages.

Hongsik Chol et al: "Minimal delay traffic grooming in WDM optical star Networks", XP019214483, dated May 1, 2006, total 8 pages.

Yufeng Xin et al: "A pure framework for cost-effective virtual ring based traffic grooming in WDM optical networks", XP010890358, dated Oct. 3, 2005, total 6 pages.

Office action issued in corresponding European patent application No. EP08700049.3, dated Nov. 12, 2010; total 6 pages.

Written opinion issued in corresponding PCT application No. PCT/CN2008/070023, dated Apr. 17, 2008; total 5 pages.

* cited by examiner

FIG.1 - Prior Art

GROOMING METHOD AND APPARATUS FOR OPTICAL COMMUNICATION NETWORK

CROSS REFERENCE

The application is a continuation of International Application No. PCT/CN2008/070023, filed on Jan. 4, 2008, which claims priority to Chinese Patent Application No. 200710087515.x, filed on Mar. 16, 2007 with the State Intellectual Property Office of the People's Republic of China, entitled "GROOMING METHOD AND APPARATUS FOR OPTICAL COMMUNICATION NETWORK", the entire contents of all of which are incorporated herein by reference.

FIELD OF THE INVENTION

The present invention relates to grooming technique in communication field, and more specifically to grooming apparatus and method for optical communication network.

BACKGROUND

With the rapid development of packet service, the design of future communication network is focusing on optimizing packet service, especially IP service. Therefore, it is vital to enhance service grooming capability and improve the efficiency of service transmission. Currently, a grooming method mainly includes the following electrical cross connection or optical cross connection on a wavelength level basis, such as Reconfiguration Optical Add/Drop Multiplexing (ROADM), can selectively transfer upstream/downstream local service and carry out transmission based on a certain wavelength while transmission of other wavelengths is not affected.

The existing ROADM includes ROADM based on Wavelength Selected Switch (WSS). The structure of such ROADM is illustrated in FIG. 1. FIG. 1 illustrates a 4 dimensional ROADM system constituted by 8 WSS devices, with two loops of services invoking each other. There are various approaches to implement WSS. The most popular one is Micro-Electro Mechanical System (MEMS) technique. The WSS-based ROADM operates in the following way. A multi-wavelength optical signal is de-multiplexed by a grating device into a plurality of optical signals with different single wavelengths. After optical signals with different single wavelengths are amplified and dispersion-compensated, they were focused on different MEMS lenses. By controlling the reflection angle of the MEMS lenses, optical signals with different single wavelengths can be reflected at different output ports. Each output port employs the grating device to multiplex these single-wavelength optical signals into a multi-wavelength optical signal. Since each MEMS device is controlled independently, configuring an optical signal with arbitrary wavelength to an arbitrary output port can be achieved. Moreover, each output port of WSS may also be able to transfer upstream/downstream local services.

Inventors of the present invention discover that the existing ROADM has the following defects. The issues of light dispersion and light power loss cannot be addressed thoroughly. Especially, for a network with multi-dimensional nodes, the light dispersion and light power loss problem is particularly severe, and the light noise accumulation is also considerable. Moreover, the existing ROADM cannot adequately monitor the light signal-to-noise ratio, which affects the management of light signal-to-noise ratio. The existing ROADM also fails to monitor wavelength in real time, which affects the monitoring of optical wavelength from port to port. Also, the existing ROADM cannot address the wavelength conflicts and does not support broadcast or multicast of the service. Further, the existing ROADM employs optical devices which are rather expensive and may not be commercialized at present.

SUMMARY

Grooming apparatuses and methods for optical communication network are provided according to an embodiment of the present invention. The apparatuses and methods provide solution to the light noise accumulation problem, eliminate optical wavelength conflicts, and support broadcast and multicast service.

To solve the foregoing problem, technical solutions are presented below to achieve the objective of the present invention.

A grooming apparatus for an optical communication network includes a first photoelectric integration unit and an electrical-layer grooming unit. The first photoelectric integration unit includes a wavelength division demultiplexing unit and a photo-electric conversion unit.

The wavelength division demultiplexing unit is configured to demultiplex a received multi-wavelength optical signal into single-wavelength optical signals.

The photo-electric conversion unit is configured to perform a photo-electric conversion on the single-wavelength optical signals and generate single-wavelength electrical signals.

The electrical-layer grooming unit is configured to groom the single-wavelength electrical signal and output the groomed electrical signals.

A grooming apparatus for an optical communication network includes:

a mapping unit, configured to map service data into a unified mapped container signal;

an electrical-layer grooming unit, configured to groom the unified mapped container signal;

an electric-photo conversion unit, configured to perform an electric-photo conversion on the unified mapped container signal output from the electrical-layer grooming unit and generate single-wavelength optical signals; and a wavelength division multiplexing unit, configured to multiplex single-wavelength optical signals into a multi-wavelength optical signal and output the multi-wavelength optical signal.

A grooming method for an optical communication network includes:

demultiplexing a received multi-wavelength optical signal into single-wavelength optical signals;

performing an photo-electric conversion on the single wavelength optical signals with and generating single-wavelength electrical signals; and grooming and outputting the single-wavelength electrical signals.

A grooming method for an optical communication network includes:

mapping service data into a unified mapped container signal;

grooming the unified mapped container signal;

performing an electric-photo conversion on the groomed unified container signal and generating a single-wavelength optical signal; and multiplexing the single-wavelength optical signals into a multi-wavelength optical signal and outputting the multi-wavelength optical signal.

As can be seen from the above technical solutions, embodiments of the present invention perform a photo-electric conversion on optical signals and groom the electrical signal. Photo-electric conversion is performed in the optical network so that the light noise accumulation is eliminated, addressing the problem of the restricted grooming of light signal-to-noise ratio. An electrical-layer grooming unit is also employed to output the single-wavelength electrical signals. Due to the characteristics of the electrical-layer grooming unit, the present invention is able to address the optical wavelength conflict issue and can support broadcast and multicast services.

DETAILED DESCRIPTION

Detailed description on various embodiments of the present invention is given below in connection with the accompany drawings.

Figure 1:
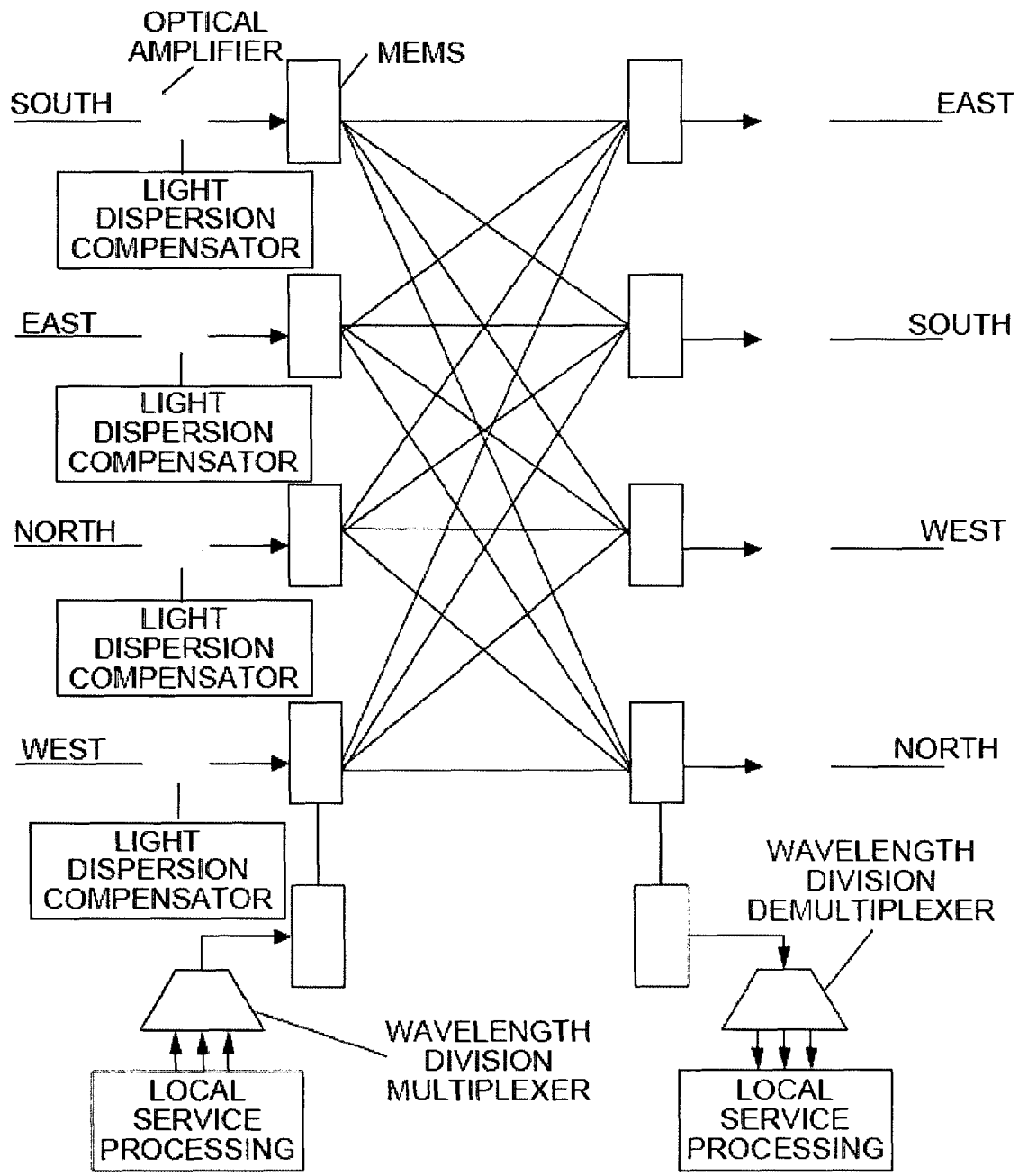
FIG. 1 is an architecture of ROADM in the prior art.
Figure 2:
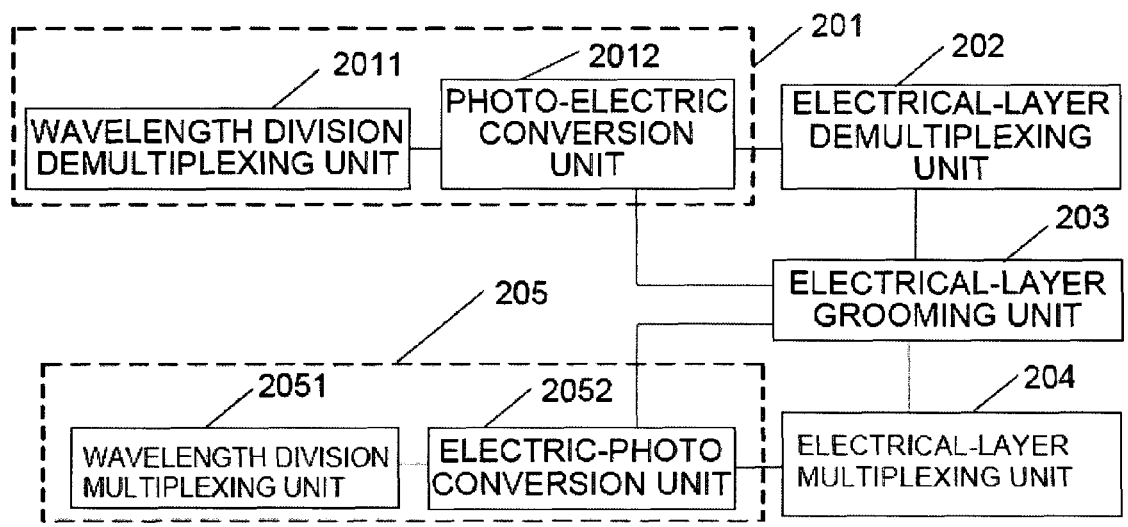
FIG. 2 is a block diagram of a grooming apparatus in an optical communication network according to a first embodiment of the present invention.

FIG. 2 is a block diagram of a grooming apparatus in an optical communication network according to a first embodiment of the present invention. The apparatus is used to groom optical wavelength. The apparatus includes a first photoelectric integration unit 201, an electrical-layer demultiplexing unit 202, an electrical-layer grooming unit 203, an electrical-layer multiplexing unit 204, and a second photo-electric integration unit 205. The first photo-electric integration unit 201 includes a wavelength division demultiplexing unit 2011, photo-electric conversion unit 2012. The second photoelectric integration unit 205 includes an electric-photo conversion unit 2052 and a wavelength division multiplexing unit 2051.

A multi-wavelength optical signal is decomposed by the wavelength division demultiplexing unit 2011 into a plurality of single-wavelength optical signals. The single-wavelength optical signals undergo a photo-electric convention by a photo-electric conversion unit 2012 and become single-wavelength electrical signals. The single-wavelength electrical signals are electrical signals converted from a single-wavelength optical signal. The first photoelectric integration unit 201 implements amplification, rectification, and re-timing, which can be configured to recover the single-wavelength optical signals, compensate the dispersion occurred in the Wavelength Division Multiplexing (WDM) system and compensate the light power loss. The electrical-layer demultiplexing unit 202 is configured to de-multiplex the single-wavelength electrical signals and output a unified mapped container signal. The unified mapped container signal may be a Virtual Container (VC) or an Optical Channel Data Unit (ODU).

The electrical-layer grooming unit 203 grooms the unified mapped container signal and outputs this signal to the electrical-layer multiplexing unit 204. The electrical-layer grooming unit 203 may employ an electrical-layer grooming matrix to groom the electrical-layer signal. The electrical-layer grooming matrix may groom the electrical-layer signal converted from the optical signal according to the requirement for transferring service in the optical network, i.e., which wavelength of the optical signal should be transmitted to which output port. Therefore, no conflicts among electrical-layer signals will occur and the issue of optical wavelength conflicts can be addressed. The electrical-layer signal may be a single-wavelength electrical signal and/or a unified mapped container signal. Further, due to the characteristics of the electrical-layer grooming matrix, the electrical-layer signal from one input port can be directed to a plurality of output ports, i.e., multicast and/or broadcast service is realized. The electrical-layer matrix may be a cross connect chip for electrical layer.

The electrical-layer multiplexing unit 204 may multiplex the unified mapped container signal from the electrical-layer grooming unit 203 into high rate single-wavelength electrical signals in a direct interpolating manner or a bit interpolating manner. The electric-photo conversion unit 2052 performs an electric-photo conversion on the single-wavelength electrical signals and generates single-wavelength optical signals and outputs to the wavelength division multiplexing unit 2051. The wavelength division multiplexing unit 2051 multiplexes the single-wavelength optical signals and outputs the single-wavelength optical signals.

In particular, the electrical-layer demultiplexing unit 202 and/or electrical-layer multiplexing unit 204 may employ a Mapping Processor (MAP processor).

In addition, the goal of the embodiments can be achieved without the electrical-layer demultiplexing unit 202 and the electrical-layer multiplexing unit 204. The single-wavelength electrical signals converted by the photo-electric conversion unit 2012 may be input directly to the electrical-layer grooming unit 203 which grooms the single-wavelength electrical signals and outputs these signals to the electric-photo conversion unit 2052 directly.

Figure 3:
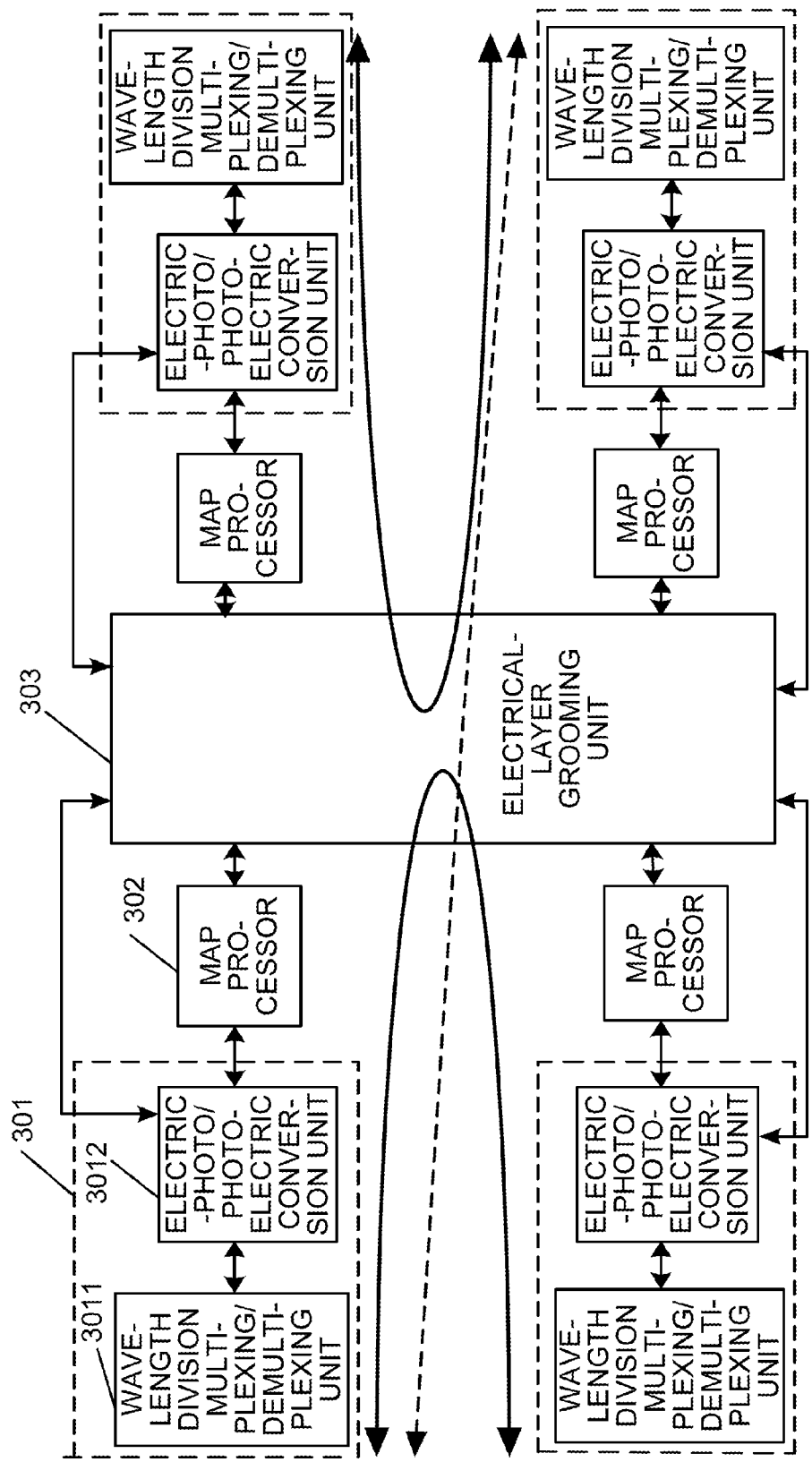
FIG. 3 is a block diagram of a grooming apparatus in an optical communication network according to a second embodiment of the present invention.

Referring to FIG. 3, a grooming apparatus in an optical communication network is provided according to a second embodiment of the present invention. The apparatus is used to groom multi-dimensional multi-wavelengths loop service. The difference between the first embodiment and the second embodiment is that signals processed by the photoelectric integration unit 301 may be bidirectional. The photoelectric integration unit 301 includes a wavelength division multiplexing/demultiplexing unit 3011, an electric-photo/photo-electric conversion unit 3012. A MAP processor 302 provides demultiplexing and/or multiplexing functions. The data processed by the electrical-layer grooming unit 303 may be bidirectional. Bold solid lines with bidirectional arrows refer to inner-loop grooming. Dotted lines with bidirectional arrows refer to inter-loop grooming.

Figure 4:
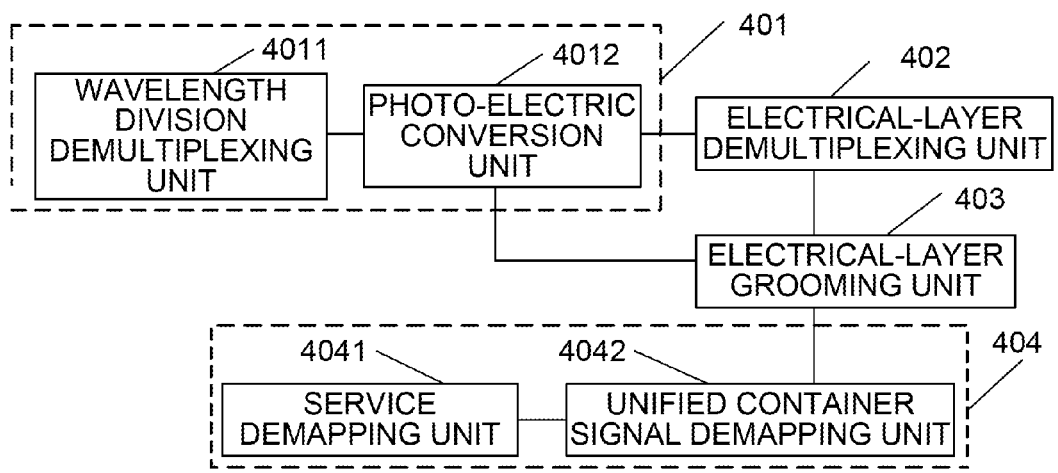
FIG. 4 is a block diagram of a grooming apparatus in an optical communication network according to a third embodiment of the present invention.

Referring to FIG. 4, a grooming apparatus in an optical communication network is provided according to a third embodiment of the present invention. The apparatus is used to groom the drop-loop in the local service. The apparatus includes a first photoelectric integration unit 401, an electrical-layer demultiplexing unit 402, an electrical-layer grooming unit 403, and a demapping unit 404. The first photoelectric integration unit 401 includes a wavelength division demultiplexing unit 4011 and a photo-electric conversion unit 4012. The demapping unit 404 may include a unified container signal demapping unit 4042 and a service demapping unit 4041.

A multi-wavelength optical signal is decomposed by the wavelength division demultiplexing unit 4011 into a plurality of single-wavelength optical signals. The single-wavelength optical signals undergo a photo-electric convention by a photo-electric conversion unit 4012 and become single-wavelength electrical signals which are subsequently output to the electrical-layer demultiplexing unit 402. The first photoelectric integration unit 401 provides amplification, rectification, and re-timing functions. Moreover, it is capable of recovering the single-wavelength optical signal and compensating the dispersion occurred in the WDM system so as to compensate the light power loss. The electrical-layer demultiplexing unit 402 de-multiplexes the single-wavelength electrical signals and obtains a unified mapped container signal which is then output to the electrical-layer grooming unit 403.

The electrical-layer grooming unit 403 grooms the unified mapped container signal and outputs the unified mapped container signal to the unified container signal demapping unit 4042.

The unified container signal demapping unit 4042 demaps the unified mapping container signal and extracts the data frame. The unified mapped container signal may be a Virtual Container or Optical Channel Data Unit (ODU). The service demapping unit 4041 is used to demap the data frame, remove the data header, and extract service data.

The unified container signal demapping unit 4042 may utilize a MAP processor.

The goal of the present invention can be achieved without the electrical-layer demultiplexing unit 402. That is, the single-wavelength electrical signals obtained from the photoelectric conversion unit 4012 are output directly to the electrical-layer grooming unit 403.

Figure 5:
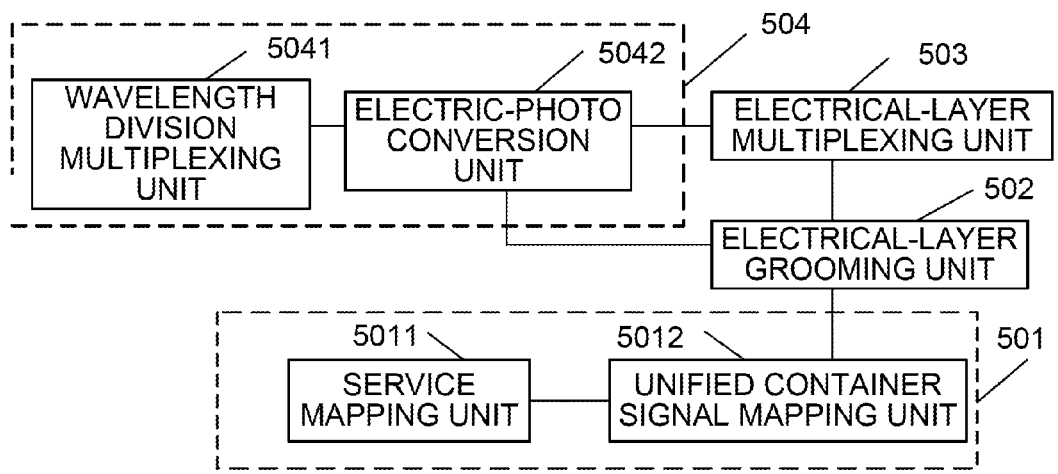
FIG. 5 is a block diagram of a grooming apparatus in an optical communication network according to a fourth embodiment of the present invention.

Referring to FIG. 5, a grooming apparatus for an optical communication network is provided according to a fourth embodiment of the present invention. The apparatus is used to groom the add-loop of the local service. The apparatus includes a mapping unit 501, an electrical-layer grooming unit 502, an electrical-layer multiplexing unit 503, and a second photoelectric integration unit 504. The mapping unit 501 includes a service mapping unit 5011 and a unified container signal mapping unit 5012. The second photoelectric integration unit 504 includes an electric-photo conversion unit 5042 and a wavelength division multiplexing unit 5041.

The service mapping unit 5011 is configured to add data header to the service data to obtain a data frame. The unified container signal mapping unit 5012 is used to map the data frame into a unified mapped container signal based on the data header in a byte cross connect manner. The unified mapped container signal is then output to the electrical-layer grooming unit 502.

The electrical-layer grooming unit 502 is configured to output the unified mapped signal to the electrical-layer multiplexing unit 503.

The electrical-layer multiplexing unit 503 is configured to multiplex the unified mapped container signal from the electrical-layer grooming unit 502 into single-wavelength electrical signals and output these signals to the electric-photo conversion unit 5042.

The electric-photo conversion unit 5042 is configured to perform an electric-photo conversion on the single-wavelength electrical signals generated from the electrical-layer multiplexing unit 503 to generate single-wavelength optical signals and output the optical signals to the wavelength division multiplexing unit 5041.

The wavelength division multiplexing unit 5041 is configured to multiplex a plurality of single-wavelength optical signals into a multi-wavelength optical signal and output the multi-wavelength optical signal.

The unified container signal mapping unit 5012 may utilize a MAP processor.

Figure 6:
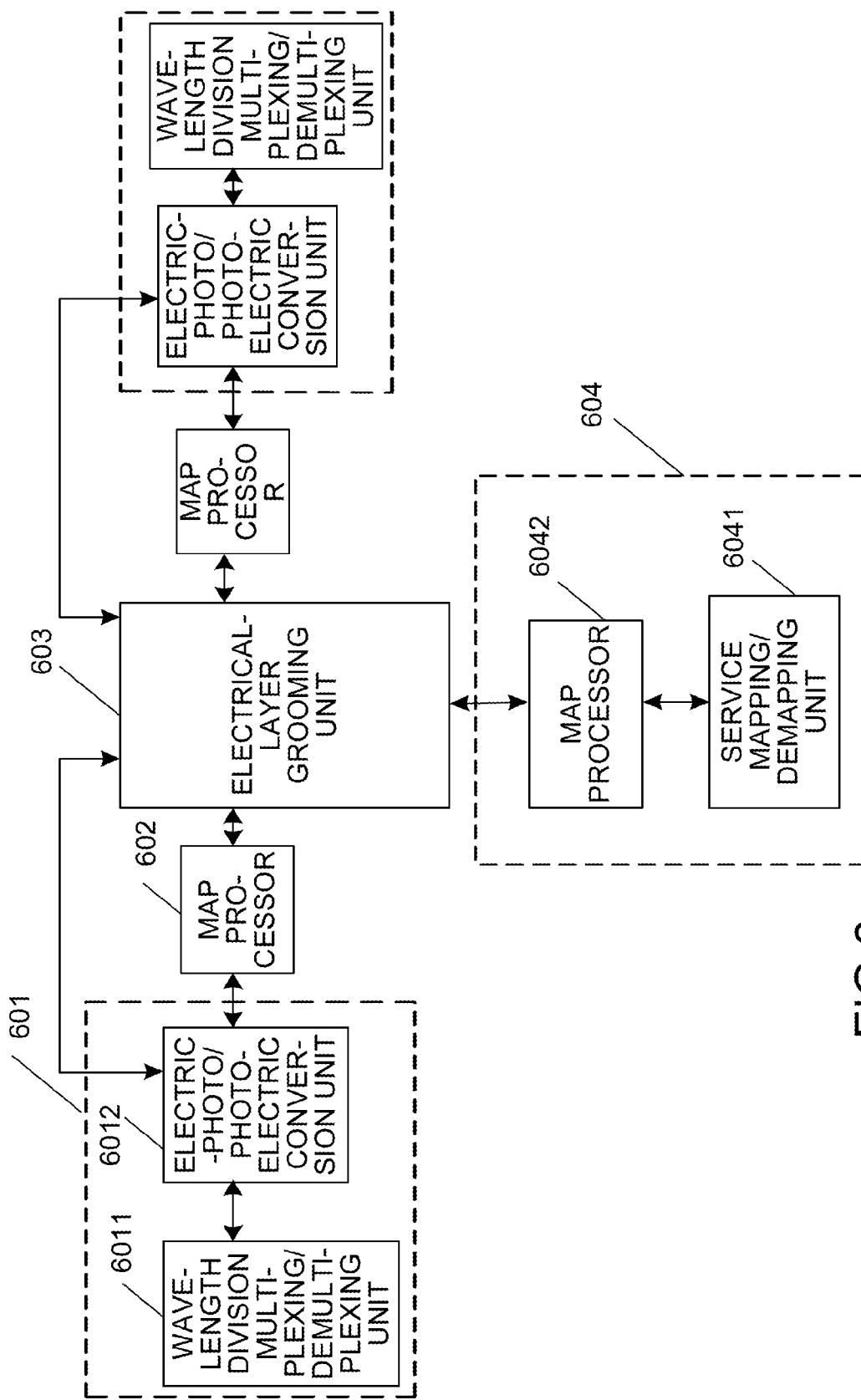
FIG. 6 is a block diagram of a grooming apparatus in an optical communication network according to a fifth embodiment of the present invention.

Referring to FIG. 6, a grooming apparatus for an optical communication network is provided according to a fifth embodiment of the present invention. The apparatus is used to groom add/drop-loop of the local service. The difference between the fifth embodiment and the fourth/third embodiment is that signals processed by the photoelectric integration unit 601 may be bidirectional. The photoelectric integration unit 601 includes a wavelength division multiplexing/demultiplexing unit 6011, and an electric-photo/photo-electric conversion unit 6012. A MAP processor 602 provides demultiplexing and/or multiplexing functions. The data processed by an electrical-layer grooming unit 603, a MAP processor 6042 and a service mapping/demapping unit 6041 may be bidirectional. The MAP processor 6042 may map/demap the unified container signal.

Figure 7:
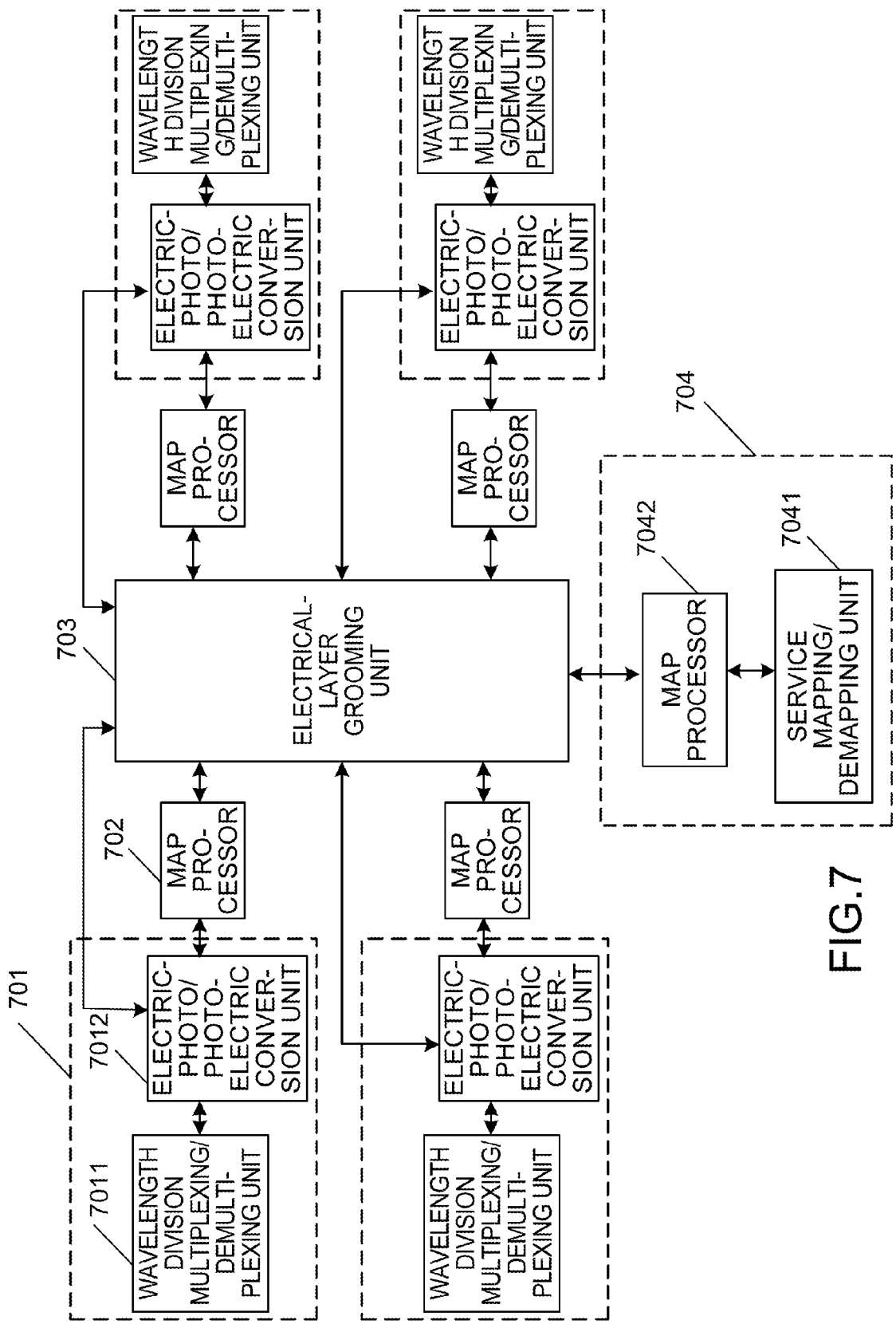
FIG. 7 is a block diagram of a grooming apparatus in an optical communication network according to a sixth embodiment of the present invention.

Referring to FIG. 7, a grooming apparatus for an optical communication network is provided according to a sixth embodiment of the present invention. The apparatus is configured to flexibly groom the multi-dimensional electrical wavelengths. The apparatus is capable of grooming the add/drop-loop of the local service and/or grooming the wavelength. Signals processed by a photoelectric integration unit 701 may be bidirectional. The photoelectric integration unit 701 includes a wavelength division multiplexing/demultiplexing unit 7011 and an electric-photo/photo-electric conversion unit 7012. A MAP processor 702 provides demultiplexing and/or multiplexing functions. The signal processed by the MAP processor can be bidirectional. The Data processed by an electrical-layer grooming unit 703, a MAP processor 7042 and a service mapping/demapping unit 7041 may be bidirectional. The MAP processor 7042 may map/demap the unified container signal.

Figure 8:
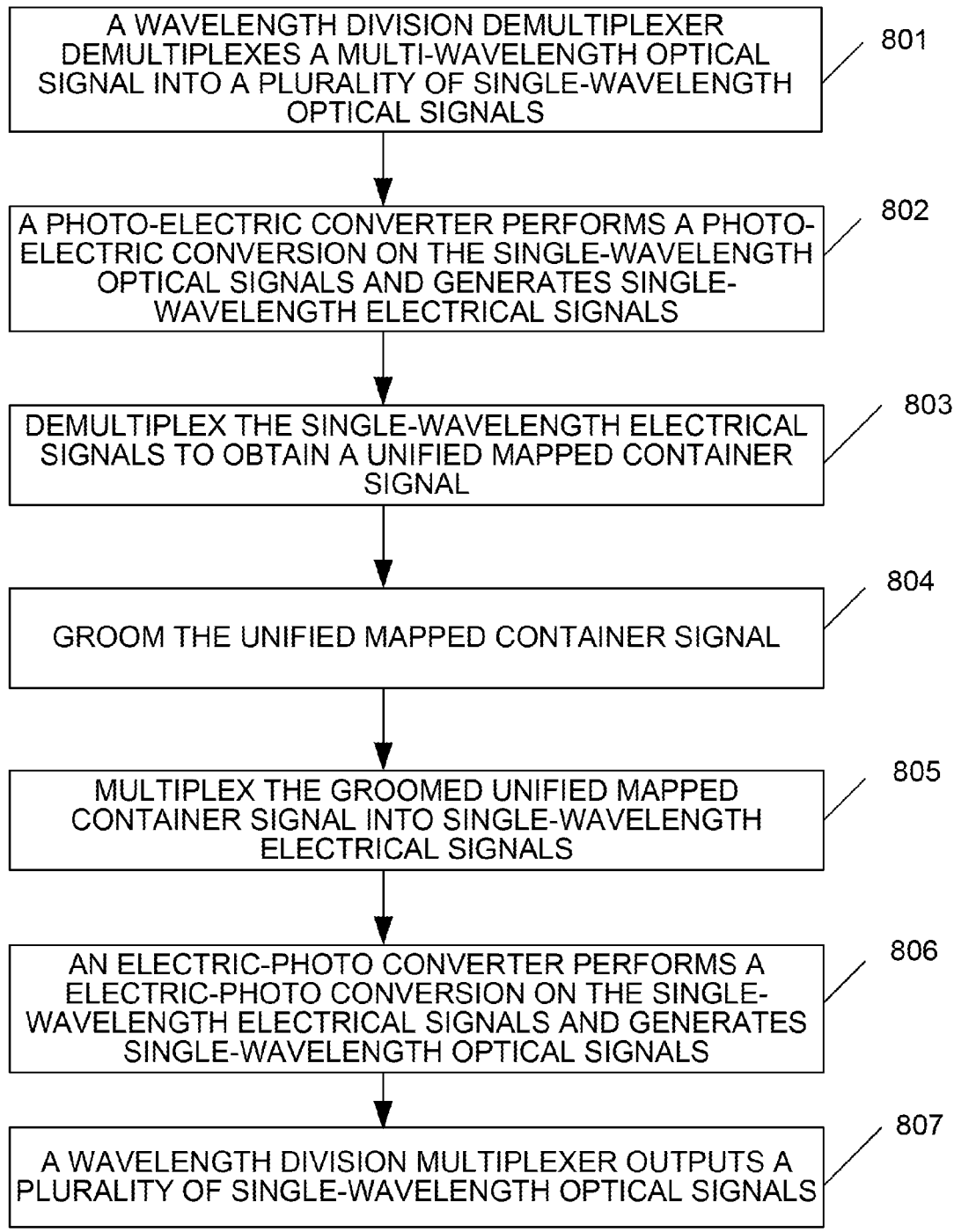
FIG. 8 is a block diagram of a grooming apparatus in an optical communication network according to a seventh embodiment of the present invention.

Referring to FIG. 8, a grooming method for grooming wavelength in an optical communication network is provided according to a seventh embodiment of the present invention. The method includes the following steps.

Step 801: A wavelength division demultiplexer de-multiplexes a multi-wavelength optical signal into a plurality of single-wavelength optical signals.

Step 802: A photo-electric converter performs a photo-electric conversion on the single-wavelength optical signals and generates single-wavelength electrical signals.

Step 803: The single-wavelength electrical signals is de-multiplexed to obtain a unified mapped container signal.

Step 804: The unified mapped container signal is groomed.

Step 805: The groomed unified mapped container signal is multiplexed into high-rate single-wavelength electrical signals in a direct interpolating manner or in a bit interpolating manner.

Step 806: An electric-photo converter performs an electric-photo conversion on the single-wavelength electrical signals and generates single-wavelength optical signals.

Step 807: A wavelength division multiplexer outputs a plurality of single-wavelength optical signals.

The goal of the present invention can also be achieved without step 803 and step 805. At Step 804, single-wavelength electrical signals may be groomed directly.

The high-rate single-wavelength electrical signals obtained at step 805 and the single-wavelength electrical signals generated at step 802 may or may not be the same signals.

The single-wavelength optical signals obtained at step 806 and the single-wavelength optical signals de-multiplexed at step 801 may or may not be the same signals.

The multi-wavelength optical signal multiplexed, at step 807, from a plurality of single-wavelength optical signals and the multi-wavelength optical signal at step 801 may or may not be the same signal.

Figure 9:
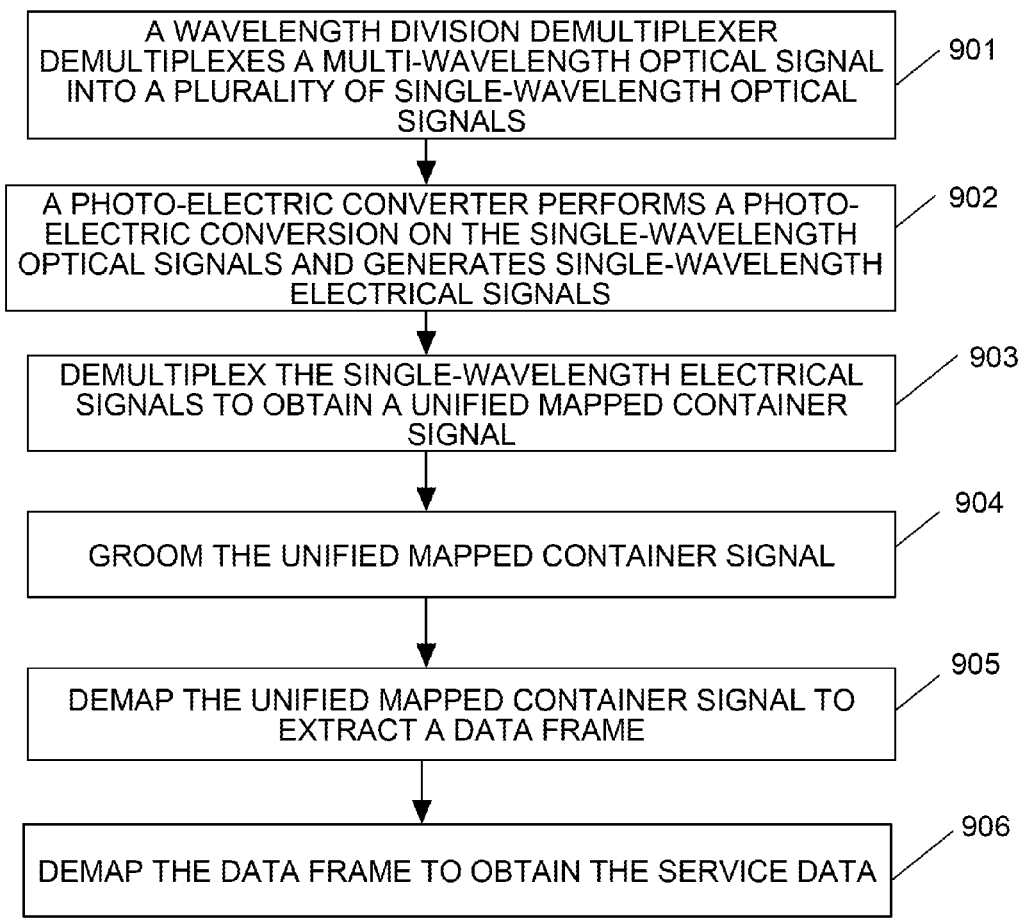
FIG. 9 is a block diagram of a grooming apparatus in an optical communication network according to an eighth embodiment of the present invention.

Referring to FIG. 9, a grooming method for grooming drop-loop of the local service in an optical communication network is provided according to an eighth embodiment of the present invention. The method includes the following steps.

Steps 901~904 are similar to steps 801~804.

Step 905: The unified mapped container signal is demapped to extract a data frame.

Step 906: The data frame is demapped so as to obtain the service data.

Figure 10:
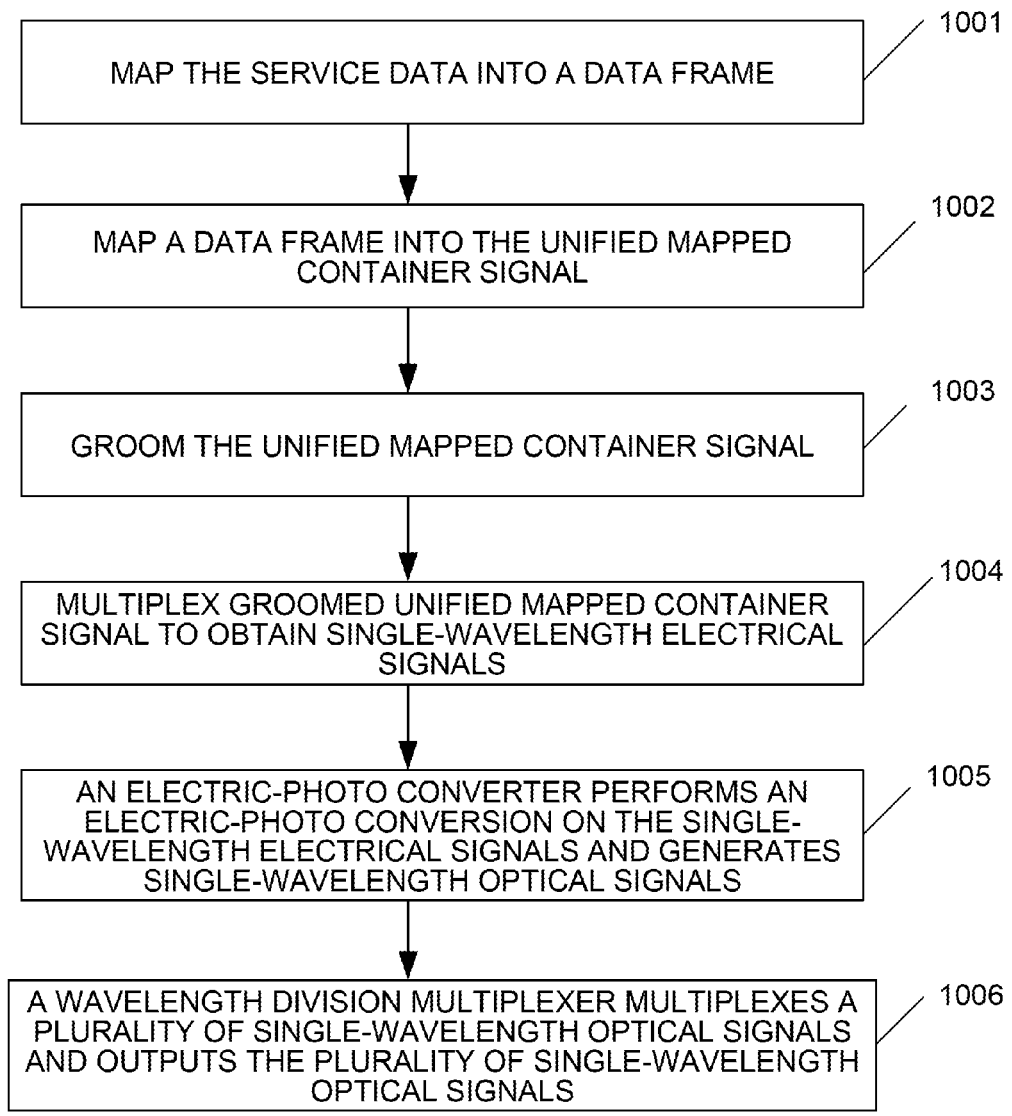
FIG. 10 is a block diagram of a grooming apparatus in an optical communication network according to a ninth embodiment of the present invention.

Referring to FIG. 10, a grooming method for grooming add-loop of the local service in an optical communication network is provided according to a ninth embodiment of the present invention. The method includes the following steps.

Step 1001: A data header is inserted into the service data to obtain a data frame.

Step 1002: The data frame is mapped into a unified mapped container signal based on the data header in a byte cross connect manner.

Step 1003: The unified mapped container signal is groomed.

Step 1004: The groomed unified mapped container signal is multiplexed to obtain single-wavelength electrical signals.

Step 1005: An electric-photo converter performs an electric-photo conversion on the single-wavelength electrical signals and generates single-wavelength optical signals.

Step 1006: A wavelength division multiplexer multiplexes a plurality of single-wavelength optical signals into a multi-wavelength optical signal and outputs the multi-wavelength optical signal.

From the above analysis, technical effects as a result of the above proposed solutions according to the present invention are described below.

1. In an embodiment of the present invention, a photoelectric integration unit is provided to perform photo-electric conversion or electric-photo conversion. The photoelectric integration unit provides amplifications, rectification, and re-timing functions. Moreover, the photoelectric integration unit is able to recover the single-wavelength optical signal and is also able to compensate light dispersion so as to compensate the light power loss.

2. In an embodiment of the present invention, a photoelectric integration unit is employed to perform an optical-electric-photo conversion. Light noise accumulation issue may be eliminated in the optical network so that the problem of restricted management on light signal-to-noise ratio can be solved.

3. In an embodiment of the present invention, an MAP processor is provided to process the unified mapped container signal. An overhead byte defined by the mapped container may be employed to track the wavelength and/or service data in the network in real time so that the problem of restricted grooming on wavelength is addressed.

4. In an embodiment of the present invention, an electrical-layer grooming unit is provided to groom the single-wavelength electrical signals. Due to the characteristics of the electrical-layer grooming method employed by the electrical-layer grooming unit, wavelength conflict is eliminated, and broadcast and/or multicast service can be realized.

5. In an embodiment of the present invention, the photo-electric integration unit, the electrical-layer grooming unit, and the MAP processor, etc., are utilized to constitute a low cost system for flexibly grooming the multi-dimensional optical wavelength based on electricity.

Grooming methods and systems in an optical communication network according to embodiments of the present invention are presented above in details. Several specific examples are given to the present invention to illustrate the principle and implementation of the present invention. The description of the embodiments is intended merely to facilitate the understanding of the method and key ideas of the present invention. Further, it is readily appreciated by those skilled in the art that any modification can be made to the specific implementation and application field without departing from the spirit and scope of the present invention. Accordingly, the content of the specification shall not be construed as a limitation to the present invention.

What is claimed is:

1. A grooming apparatus for an optical communication network, comprising:
   a first photoelectric integration unit comprising a wavelength division demultiplexing unit and a photo-electric conversion unit;
   an electrical-layer grooming unit directly connected to the photo-electric conversion unit without any intervening components;
   a first electric-photo conversion unit directly connected to the electrical-layer grooming unit without any intervening components, wherein the first electric-photo conversion unit is configured to receive a plurality of second single-wavelength electrical signals from the electrical-layer grooming unit and perform an electric-photo conversion to generate a plurality of second single-wavelength optical signals;
   a wavelength division multiplexing unit coupled to the first electric-photo conversion unit, wherein the wavelength division multiplexing unit is configured to multiplex the second single-wavelength optical signals generated from the first electric-photo conversion unit into a second multi-wavelength optical signal and output the second multi-wavelength optical signal;
   an electrical-layer demultiplexing unit coupled to the photo-electric conversion unit and the electrical-layer grooming unit; and
   an electrical-layer multiplexing unit coupled to the first electric-photo conversion unit and the electrical-layer grooming unit,
   wherein the wavelength division demultiplexing unit is configured to demultiplex a received multi-wavelength optical signal into a plurality of single-wavelength optical signals,
   wherein the photo-electric conversion unit is configured to perform a photo-electric conversion on the single-wavelength optical signals generated from the wavelength division demultiplexing unit and generate a plurality of single-wavelength electrical signals,
   wherein the electrical-layer grooming unit is configured to groom the single-wavelength electrical signals, wherein the electrical-layer demultiplexing unit is configured to demultiplex the single-wavelength electrical signals generated from the photo-electric conversion unit into a unified mapped container signal, wherein the electrical-layer grooming unit is further configured to receive the unified mapped container signal from the electrical demultiplexing unit, groom the unified mapped container signal and send the groomed unified mapped container signal to the electrical-layer multiplexing unit, and wherein the electrical-layer multiplexing unit is configured to multiplex the groomed unified mapped container signal generated from the electrical-layer grooming unit into the groomed second single-wavelength electrical signals and output the groomed second single-wavelength electrical signals to the first electric-photo conversion unit.

2. The apparatus of claim 1 further comprising a second electric-photo conversion unit directly connected to the electrical-layer grooming unit without any intervening components, wherein the electrical-layer grooming unit is further configured to output the plurality of second single-wavelength electrical signals to the first electric-photo conversion unit and second electric-photo conversion unit.

3. A grooming apparatus for an optical communication network, comprising:
    a first photoelectric integration unit comprising a wavelength division demultiplexing unit and a photo-electric conversion unit;
    an electrical-layer grooming unit directly connected to the photo-electric conversion unit without any intervening components;
    a demapping unit coupled to the electrical-layer grooming unit, wherein the demapping unit is configured to demap the second single-wavelength electrical signals generated from the electrical-layer grooming unit and extract service data; and
    an electrical-layer demultiplexing unit coupled to the photo-electric conversion unit and the electrical-layer grooming unit,
    wherein the wavelength division demultiplexing unit is configured to demultiplex a received multi-wavelength optical signal into a plurality of single-wavelength optical signals,
    wherein the photo-electric conversion unit is configured to perform a photo-electric conversion on the single-wavelength optical signals generated from the wavelength division demultiplexing unit and generate a plurality of single-wavelength electrical signals,
    wherein the electrical-layer grooming unit is configured to groom the single-wavelength electrical signals,
    wherein the electrical-layer demultiplexing unit is configured to demultiplex the single-wavelength electrical signals generated by the photo-electric conversion unit into a unified mapped container signal, and
    wherein the electrical-layer grooming unit is further configured to groom the unified mapped container signal and output the groomed unified mapped container signal to the demapping unit.

4. A grooming apparatus for an optical communication network, comprising:
    an electrical-layer grooming unit comprising an ingress side and an egress side;
    a mapping unit coupled to the electrical-layer grooming unit's ingress side, wherein the mapping unit is configured to map service data into a unified mapped container signal;
    a first electric-photo conversion unit coupled to the electrical-layer grooming unit's egress side;
    a second electric-photo conversion unit coupled to the electrical-layer grooming unit's egress side; and
    a wavelength division multiplexing unit coupled to the first electric-photo conversion unit, wherein the first wavelength division multiplexing unit is configured to multiplex the single-wavelength optical signals generated by the first electric-photo conversion unit into a multi-wavelength optical signal and output the multi-wavelength optical signal,
    wherein the electrical-layer grooming unit is configured to groom the unified mapped container signal received from the mapping unit on the ingress side, and
    wherein the egress side is configured to output the groomed unified mapped container signal to both the first electric-photo conversion unit and the second electric-photo conversion unit on the egress side, and
    wherein the first electric-photo conversion unit and the second electric-photo conversion unit are configured to perform an electric-photo conversion on the unified mapped container signal generated from the electrical-layer grooming unit and generate single-wavelength optical signals.

5. The apparatus of claim 4, wherein the mapping unit comprises:
    a service mapping unit; and
    a unified container signal mapping unit coupled to the service mapping unit and electrical-layer grooming unit,
    wherein the service mapping unit is configured to map the service data into a data frame, and wherein the unified container signal mapping unit is configured to map the data frame generated from the service mapping unit into a unified mapped container signal.

6. The apparatus of claim 5, further comprising:
    an electrical-layer multiplexing unit coupled to the electric-photo conversion unit and the electrical-layer grooming unit,
    wherein the electrical-layer multiplexing unit is configured to multiplex the unified mapped container signal generated from the electrical-layer grooming unit into a second plurality of single-wavelength electrical signals, and
    wherein the first electric-photo conversion unit is configured to perform an electric-photo conversion on the second plurality of single-wavelength electrical signals generated from the electrical-layer multiplexing unit, and generate the second plurality of single-wavelength optical signals.

7. A grooming method for an optical communication network, comprising:
    demultiplexing a received multi-wavelength optical signal into a first plurality of single-wavelength optical signals;
    performing a photo-electric conversion on the first plurality of single-wavelength optical signals and generating a first plurality of single-wavelength electrical signals;
    grooming the first plurality of single-wavelength electrical signals, wherein the first plurality of single-wavelength electrical signals are copied to create a second plurality of single-wavelength electrical signals; and
    routing the first plurality of single-wavelength electrical signals to a first output port and the second plurality of single-wavelength electrical signals to a second output port,
    wherein after grooming and routing the first plurality of single-wavelength electrical signals, the method further comprises:

performing an electric-photo conversion on the first plurality of single-wavelength electrical signals;
generating single-wavelength optical signals; and
multiplexing the single-wavelength optical signals into a multi-wavelength optical signal,
wherein prior to grooming the first plurality of single-wavelength electrical signals, the first plurality of single-wavelength electrical signals are demultiplexed to obtain a first unified mapped container signal,
wherein the first unified mapped container signal is groomed by copying the first unified mapped container signal to create a second unified mapped container signal,
wherein the first unified mapped container signal is sent to the first output port and the second unified mapped container signal is sent to the second output port, and
wherein subsequent to grooming and routing the unified mapped container signals, the unified mapped container signals are multiplexed to obtain single-wavelength electrical signals.

8. The method of claim 7, wherein after grooming and routing the first plurality of single-wavelength electrical signals, the first plurality of single-wavelength electrical signals are demapped to extract service data.

9. The method of claim 7, wherein the second plurality of single-wavelength optical signals after an electric-photo conversion and the first plurality of single-wavelength optical signals de-multiplexed from the received multi-wavelength optical signal are different single-wavelength optical signals.

10. The method of claim 7, wherein the first plurality of single-wavelength electrical signals after a photo-electric conversion and the multiplexed second plurality of single-wavelength electrical signals are different single-wavelength electrical signals.

* * * * *